(12) United States Patent
Korevaar et al.

(10) Patent No.: US 9,971,017 B2
(45) Date of Patent: May 15, 2018

(54) OPTICAL GLOBAL POSITIONING SYSTEM

(71) Applicants: Eric John Korevaar, La Jolla, CA (US); James Howard Menders, San Diego, CA (US)

(72) Inventors: Eric John Korevaar, La Jolla, CA (US); James Howard Menders, San Diego, CA (US)

( * ) Notice: Subject to any disclaimer, the term of this patent is extended or adjusted under 35 U.S.C. 154(b) by 399 days.

(21) Appl. No.: 14/804,103

(22) Filed: Jul. 20, 2015

(65) Prior Publication Data

US 2016/0363649 A1 Dec. 15, 2016

Related U.S. Application Data

(60) Provisional application No. 62/175,040, filed on Jun. 12, 2015.

(51) Int. Cl.
*G01C 3/08* (2006.01)
*G01S 5/16* (2006.01)
*G01S 1/70* (2006.01)

(52) U.S. Cl.
CPC . *G01S 5/16* (2013.01); *G01S 1/70* (2013.01)

(58) Field of Classification Search
CPC .................................. G01S 5/16; G01S 1/70
USPC ....................................................... 356/5.01
See application file for complete search history.

(56) References Cited

U.S. PATENT DOCUMENTS

| | | | |
|---|---|---|---|
| 4,973,970 A | 11/1990 | Reeser | |
| 5,038,406 A * | 8/1991 | Titterton | H04B 10/11 342/45 |
| 6,437,890 B1 * | 8/2002 | Scheps | H04B 13/02 398/104 |
| 6,593,875 B2 | 7/2003 | Bergin et al. | |
| 6,762,721 B2 | 7/2004 | Halsey et al. | |
| 7,272,074 B2 * | 9/2007 | Basilico | G01S 1/72 367/128 |
| 9,105,964 B2 | 8/2015 | Muri et al. | |
| 2015/0078178 A1 | 3/2015 | Carides et al. | |
| 2016/0320174 A1 * | 11/2016 | Geswender | G01S 1/70 |

* cited by examiner

*Primary Examiner* — Mark Hellner
(74) *Attorney, Agent, or Firm* — Nydegger & Associates

(57) ABSTRACT

In accordance with the present invention, at least three geosynchronous satellites are employed in combination, at respective known positions above a terrestrial water surface to locate an underwater terminal (vehicle). Each satellite includes a light source, and each has a controller for activating its respective light source to simultaneously transmit a light pulse, to a predetermined cell area on the terrestrial water surface, at a precisely scheduled time, $t_0$, for receipt by the underwater terminal. A computer at the terminal then evaluates the respective light pulse arrival times, $t_{1, 2 \& 3}$, to determine the location of the underwater terminal.

22 Claims, 2 Drawing Sheets

OPTICAL GLOBAL POSITIONING SYSTEM

This application claims the benefit of U.S. Provisional Patent Application Ser. No. 62/175,040, filed Jun. 12, 2015. The entire contents of Application Ser. No. 62/175,040 are hereby incorporated by reference herein.

FIELD OF THE INVENTION

The present invention pertains generally to systems and methods for locating objects relative to a terrestrial surface. More particularly, the present invention pertains to systems and methods for locating underwater objects (vehicles). The present invention is particularly, but not exclusively, useful for systems and methods which employ pulsed light beams that are transmitted from geosynchronous satellites for passive use by an underwater vehicle to determine an exact position (location) of the underwater vehicle.

BACKGROUND OF THE INVENTION

Accurately and precisely locating a communications terminal (e.g. a vehicle) can be necessary for a variety of reasons. As is well known, the task of doing this can be difficult. It becomes even more difficult when the communications terminal is located underwater (e.g. in an undersea environment). Typically, present day systems for precisely locating objects rely primarily on radio waves such as are employed by Global Positioning Systems (GPS). Radio waves, however, are essentially impenetrable into an undersea environment.

Unlike radio waves, under certain circumstances and conditions, light waves can penetrate and propagate through water; at least to some extent. Of particular importance is the demonstrated ability of light to penetrate into seawater when the light has a wavelength in the so-called blue-green seawater window (e.g. $\lambda \approx 450\text{-}500$ nm). Importantly, there are indications that light with a wavelength $\lambda \approx 455$ nm can penetrate seawater to a depth d in excess of 40 m. With this in mind, the possibility of replacing radio waves with light waves for the purpose of passively locating an underwater terminal deserves consideration.

An important consideration is that the daylight operation of an optical Global Positioning System (oGPS) must necessarily account for the solar background, which can be substantial and significantly reduce the Signal-to-Noise Ratio (SNR). For very high noise environments such as solar background, it is therefore necessary to eliminate as much noise as possible. To do this, several types of optical filters exist which only transmit light over a very narrow wavelength bandwidth, such as Lyot filters and atomic line filters. For example, U.S. Pat. No. 5,731,585, which issued to Menders et al. on Mar. 24, 1998, for an invention entitled "Voigt Filter," discloses a kind of atomic line filter which can operate at the 455 nm cesium resonance wavelength.

In light of the above, it is an object of the present invention to provide a system and method wherein light pulses are radiated from a transmitter in near space (e.g. outside the atmosphere) to a terminal (receiver) within a liquid medium (e.g. undersea), for use at a terminal to accurately and precisely determine the terminal's position in the liquid medium. Another object of the present invention is to provide a system and method for passively locating an underwater terminal wherein light pulses are simultaneously transmitted from different geosynchronous satellites onto a same cell area of a terrestrial water surface, for a use of light pulse arrival times at the underwater terminal to establish the underwater terminal's terrestrial location. Still another object of the present invention is to provide a system and method for passively locating an underwater terminal using light pulses which is simple to use, relatively easy to implement, and comparatively cost effective.

SUMMARY OF THE INVENTION

In accordance with the present invention, a system for locating a mobile underwater terminal requires the use of at least three geosynchronous satellites. A same type transmitter assembly is located on each one of the satellites, and the three transmitter assemblies are operationally employed in combination.

In structural detail, each transmitter assembly comprises a universal clock (e.g. an atomic clock); a light source (i.e. a pulsed laser unit); and a controller. In this combination, the controller of each transmitter assembly is synchronized by its universal clock with the other transmitter assemblies to activate its light source at a precisely scheduled time $t_0$. Thus, three different light pulses are generated which are simultaneously transmitted at the same time $t_0$ from a respective transmitter assembly. The present invention, however, envisions the transmission of light pulses from different transmitter assemblies with differences in transmission times being as much as 100 msec. These differences in times of transmission must be known. In any event, the light pulses are directed to shine onto a same predetermined cell area on a terrestrial water surface. The consequence here is that each light pulse will have a respective arrival time $t_n$ at the underwater terminal. In general the subscript n for $t_n$ is an integer indicative of the satellite from which the light pulse is received. For a number N=3 geosynchronous satellites, n ranges from 1 to 3.

For the present invention, light pulses will preferably be generated at 1 kHz and will have a pulse duration of less than 20 ns. Also, a cell area will be approximately 400 km$^2$. Further, as intended for the present invention the cell area can be moved along a predetermined path (e.g. a raster type pattern) over a vast water surface (e.g. the Atlantic Ocean), and repeated within a relatively short time cycle.

As implied above, a receiver will be located with the underwater terminal at an underwater depth d below the terrestrial water surface. Periodically, the receiver will receive an N number of light pulses, from an N number of geosynchronous satellites at respective arrival times $t_n$ where n ranges from 1 to N. A computer, also located with the underwater terminal, is connected with the receiver. Its purpose is to evaluate the arrival times $t_n$ from the respective transmitter assemblies, together with the depth d of the underwater terminal, and to thereby determine a terrestrial location for the underwater terminal. In detail, this calculation will preferably be accomplished by first calculating a plurality of differences $\Delta t$ between different arrival times $t_n$. Using well know geometric and mathematical techniques, each $\Delta t$ can then be used to define a curve which is approximately hyperbolic containing the receiver. Further, an intersection of two different hyperbolic curves, plus the depth of the receiver, can then be used to establish the position of the receiver (underwater terminal).

For a preferred embodiment of the present invention, an atomic line filter is included within the receiver at the underwater terminal to prevent solar background from obscuring the light pulses. In detail, the atomic line filter will include an x-polarizer; a y-polarizer; and a narrowband atomic vapor cell within a magnetic field. Functionally, the x-polarizer and y-polarizer serve to block all out-of-band light (e.g. solar background light) from passing through the atomic line filter assembly. The atomic vapor cell in the magnetic field (which in the preferred embodiment uses cesium vapor) serves to rotate the polarization of the signal pulses at 455 nm (received from the geosynchronous satellites) by 90° so that they can pass through the y-polarizer onto a detector. The increased signal-to-noise ratio afforded by the atomic line filter allows the detector to discriminate the signal pulses from the solar background light and measure the respective pulse arrival times $t_n$ for evaluation by the computer.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION OF THE PREFERRED EMBODIMENTS

Figure 1:
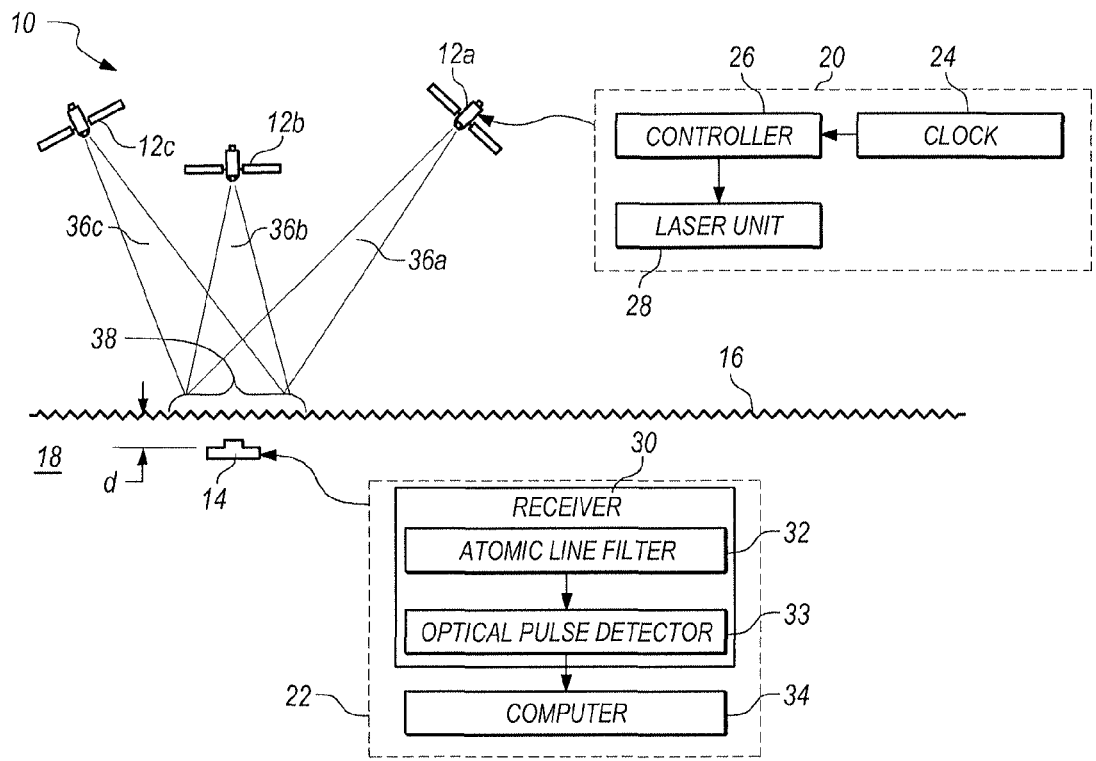
FIG. 1 is a schematic presentation of an optical Global Positioning System (oGPS) in accordance with the present invention.

Referring initially to FIG. 1 a system for passively locating an underwater object in accordance with the present invention is shown and is generally designated 10. As shown, the system 10 includes a plurality of satellites 12, of which the satellites 12a, 12b and 12c shown in FIG. 1 are only exemplary. As intended for the present invention, the satellites 12 are preferably geosynchronous. Other type satellites, however, are also envisioned for use with the present invention (e.g. medium Earth orbit satellites). FIG. 1 also shows that the system 10 includes an underwater vehicle 14 which, for disclosure purposes, is located at a depth d below the surface 16 of the sea 18.

The essential components of the system 10 which are located onboard a satellite 12 are grouped together in a transmitter assembly 20. It is to be appreciated that different satellites 12 (e.g. satellites 12a, 12b and 12c) will each have a dedicated transmitter assembly 20 onboard. Moreover, each transmitter assembly 20 will be essentially the same as every other transmitter assembly 20 in the system 10.

It is also shown in FIG. 1 that the essential components of system 10 which are onboard the underwater vehicle 14 are grouped together in a receiver assembly 22. As intended for the present invention, the receiver assembly 22 operates with the plurality of transmitter assemblies 20 in a one-way transmission mode. Stated differently, each transmitter assembly 20 in the plurality will only transmit, and the receiver assembly 22 will only receive. Thus, the underwater vehicle 14 has a passive ability to determine its location in the sea 18.

Each transmitter assembly 20 includes a universal clock 24 which will provide its respective geosynchronous satellite 12 with the exact same time. Preferably, the universal clock 24 is an atomic clock of a type well known in the pertinent art. Also included in each transmitter assembly 20 is a controller 26 and a pulsed laser unit 28. On the other hand, the receiver assembly 22 onboard the underwater vehicle 14 includes a receiver 30 and a computer 34, and the receiver 30 further comprises an atomic line filter 32 and an optical pulse detector 33. The receiver 30 is designed to measure the respective arrival times of the optical pulses from the transmitter assemblies 20.

For an operational overview of the system 10, FIG. 1 indicates that each geosynchronous satellite 12a, 12b, and 12c, will transmit a respective light beam 36a, 36b, or 36c onto a same cell area 38 that is located on the surface 16 of sea 18. As envisioned for the present invention, the cell area 38 will be approximately 400 km². Further, each light beam 36a-c will be pulsed at 1 kHz with light pulses having a pulse duration of less than 20 ns. Preferably, light pulses in the light beams 36a-c are in the blue-green seawater window with a wavelength λ≈455 nm matching a cesium atomic line filter. Under typical operation, each light beam will be scanned to a different cell area 38 on the terrestrial water surface 16 after each pulse.

Figure 2:
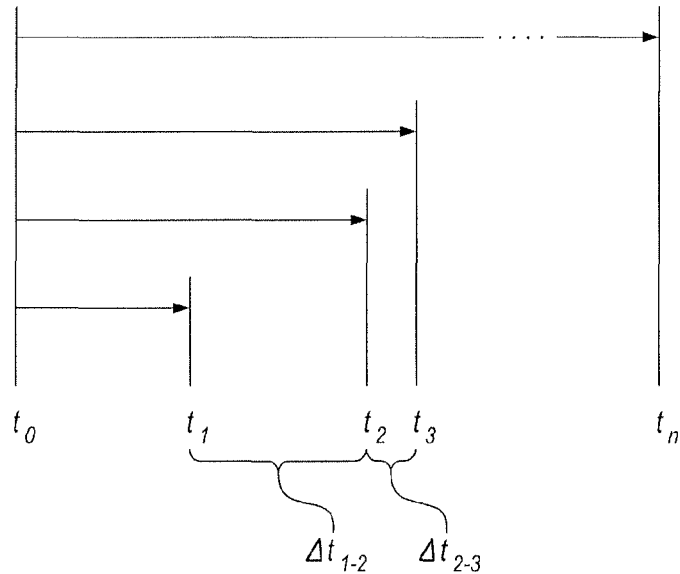
FIG. 2 depicts travel time lines for light pulses simultaneously transmitted from different geosynchronous satellites at a time $t_0$, and their respective time of arrival $t_n$, at an underwater terminal.

Operationally, all satellites 12 will each be at a known position above the surface 16 of sea 18. As positioned, an N number of satellites 12 will transmit an N number of light pulses in their respective light beams 36 onto a predetermined cell area 38 of the water surface 16, at a precisely scheduled time $t_0$. As noted above, the transmit time $t_0$ may be the same for each satellite 12 (i.e. simultaneous) or they may have known differences. In any event, the pulses transmitted in the light beams 36 at time $t_0$ will then have respective arrival times $t_n$ at the underwater vehicle 14 where n ranges from 1 to N. Importantly, the relationships between the transmit time $t_0$, will be known for all satellites 12, and the various arrival times $t_n$ at the underwater vehicle 14 will be different from each satellite 12. An example for simultaneous times $t_0$ is set forth in FIG. 2. As shown, the subscripts used for the arrival times indicate the satellite 12 from which the particular pulse was transmitted. For instance, $t_1$ indicates the arrival time at underwater vehicle 14 of a light pulse that was transmitted at time $t_0$ from a first satellite 12 (e.g. satellite 12a). Accordingly, $t_2$ is the light pulse arrival time from a second satellite 12 (e.g. satellite 12b) et seq. Although disclosure here indicates the possibility of an N number of satellites 12, and a respective number of arrival times $t_n$, it is to be appreciated that only three satellites 12 are required for the present invention. Further, FIG. 2 indicates that differences in arrival times (e.g. $\Delta t_{1-2}$ and $\Delta t_{2-3}$) are required for calculations.

Figure 3:
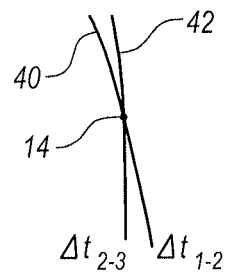
FIG. 3 is a two-dimensional presentation showing the intersection of hyperbolic curves (i.e. at the location of the underwater terminal), wherein the hyperbolic curves are each calculated to include the underwater terminal and are based on a difference between selected arrival times $t_n$ shown in FIG. 2.

An operation of the present invention essentially involves evaluating each arrival time $t_n$ together with the depth d of the underwater vehicle 14 to determine a terrestrial location for the underwater vehicle 14. Sequentially, this determination requires first calculating a plurality of differences Δt between different arrival times $t_n$ (e.g. $\Delta t_{1-2}$ and $\Delta t_{2-3}$). By measuring the differences in arrival times rather than the actual arrival times, an atomic clock is not needed on the underwater vehicle. Mathematically it can be shown that each Δt, together with a measure of the depth d of the underwater vehicle 14, will define a hyperboloidal surface in three dimensions. Thus, $\Delta t_{1-2}$ and $\Delta t_{2-3}$ will each define such a surface. Further, each hyperboloidal surface will include a hyperbola such as hyperbolas 40 and 42 shown in FIG. 3. More specifically, the hyperbola 40 is generated using $\Delta t_{1-2}$ and the hyperbola 42 is generated using $\Delta t_{2-3}$. Recall, both hyperbolas 40 and 42 will also contain information regarding the depth d of the underwater vehicle 14. Thus, still referring to FIG. 3, it then follows that the intersection of hyperbolas 40 and 42 will establish the position of the underwater vehicle 14. In general, there may be two intersection points which would indicate a location for the underwater vehicle 14, but which are separated by a very large distance. The computer 34 in the underwater vehicle 14 can determine the correct intersection point to use by knowing its approximate position ahead of time.

Figure 4:
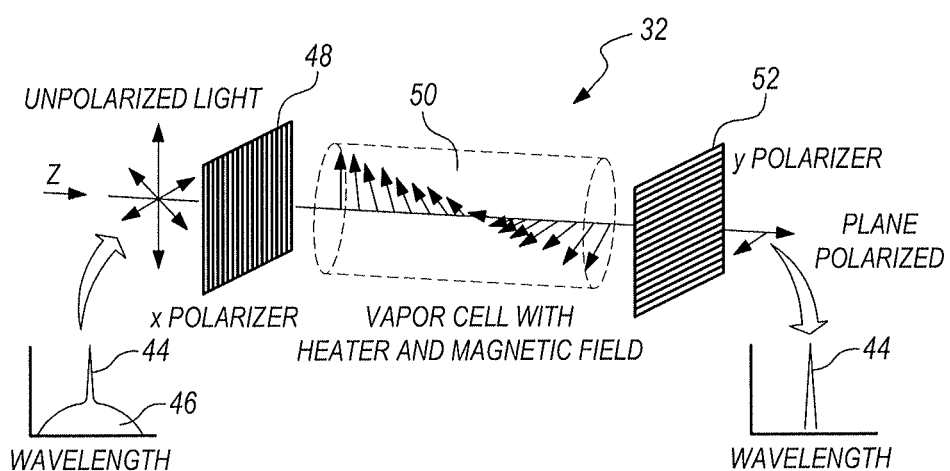
FIG. 4 is a schematic presentation of the operating principle for an atomic line filter as incorporated into the system of the present invention.

In FIG. 4, the functional characteristics of an atomic line filter 32 as employed for the system 10 are shown. Firstly, it will be appreciated that each pulse in a light beam 36 is essentially a signal 44 having a wavelength $\lambda \approx 455$ nm which matches the passband of the atomic line filter. As received by the receiver assembly 22 at the underwater vehicle 14, the signal 44 will be obscured by noise 46; most notably the solar background. The received signal 44 in this case, together with noise 46, will be unpolarized light that is passed into the atomic line filter 32. In sequence, an x-polarizer 48 is used to initially polarize the received signal 44. Next, a vapor cell 50 in a magnetic field is used to rotate the signal polarization by 90° while leaving the polarization of the solar background (i.e. the obscuring noise 46) unchanged. For the preferred operation at 455 nm, the vapor cell 50 contains cesium vapor. After its polarization is rotated through 90°, the signal 44 passes through a y-polarizer 52, while the noise 46, which is still polarized in the x-direction, is blocked by y-polarizer 52. The result here is a signal 44 having the wavelength $\lambda \approx 455$ nm that has been filtered from the noise 46, and can be detected by the detector 33 for use by the computer 34 for determining the exact location of the underwater vehicle 14.

For clarity in the description of the preferred embodiment, the light pulses from the geosynchronous satellites 12 were all transmitted at the exact same time $t_0$. In that embodiment, in order for the receiver 30 and computer 34 in the underwater vehicle 14 to determine which detected light pulse came from which satellite 12, the computer 34 needs to make use of further information about its approximate position. In some situations, especially when pulse arrival times are close together, there could be some ambiguity in this determination. In a second preferred embodiment of the present invention this ambiguity can be eliminated by having the geosynchronous satellites 12 emit pulses at different times $t_0$, as long as the computer 34 in the underwater vehicle 14 has prior knowledge of the differences in the pulse transmission times.

Specifically, the transmission time for a light pulse from a geosynchronous satellite 12 to the surface of the ocean below it is on the order of 0.13 second. The differences in arrival times from the different satellites 12 (if they all transmit pulses at the same time $t_0$) will typically be between 0 and 10 milliseconds. Therefore, if a known delay of exactly n*(100 ms) is added to the pulse transmission time for each satellite 12 (resulting in detected pulses at time $t_n$ at a given cell area 38), the computer 34 can determine exactly which pulse was transmitted by which satellite 12 without ambiguity. The added time interval of 100 ms is short enough that a conventional quartz oscillator based timer is adequate for the time interval determination to the required accuracy. In performing the position calculation, the procedure described in the first preferred embodiment would simply need to be modified by subtracting out the known time delays. Specifically, the measured $\Delta t_{1-2}$ would be adjusted by subtracting 100 ms before performing the position calculation, $\Delta t_{2-3}$ would be adjusted by subtracting 100 ms, $\Delta t_{1-3}$ would be adjusted by subtracting 200 ms, etc.

It will be obvious to those skilled in the art that the pulsed laser transmitters 28 would not need to be placed on geosynchronous satellites 12, but that the satellites 12 could be in non-geosynchronous orbits, including Medium Earth Orbits such as those used by the current GPS satellites, Low Earth Orbits, or the transmitters could even be placed in aircraft, balloons, on mountaintops, etc. Furthermore, an optical GPS system could be built using laser transmitters at other wavelengths than 455 nm, and in particular doubled Nd:YAG lasers operating at 532 nm may be used. It is not necessary to use an atomic line filter of the type described, and other narrowband filters besides atomic line filters may prove useful. While an optical pulse duration of 20 ns has been described (and is currently achievable for a laser matched to a cesium atomic line filter operating at 455 nm), those skilled in the art will know that a shorter pulse is desirable, but that in any case the pulse length only affects the accuracy of the position measurement. The instantaneous coverage area of 400 km$^2$ was chosen to obtain reasonable water depth penetration with an available laser operating at 455 nm with a pulse repetition frequency of 1 kHz, while allowing for scanning a large area of the ocean in a reasonable time. This coverage area can obviously be traded off with available laser pulse energies and repetition rates to obtain different water penetration depths or ocean area coverage. Although the system has been described in terms of using three satellites and three optical pulses, it should be clear to one versed in the art that adding more satellites and measuring more pulse arrival time differences will serve to increase the obtainable position accuracy for the underwater vehicle. If a satellite based Optical Global Positioning System according to the present invention were to be built, it would also find other uses than for determining the position of underwater vehicles. For instance, such a system would also work above water. In addition, observing laser pulses from known satellite locations with a camera based system above the water would allow for three dimensional heading and attitude information to be obtained, analogous to what could be obtained with a star tracker, but with the advantage of also working during daytime. In addition, by sending multiple laser pulses to the same ocean location from one of the satellites, the system could be used for low data rate downlink communications to an underwater vehicle.

While the particular Optical Global Positioning System as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A passive system for locating an underwater vehicle which comprises:
    a plurality of satellites;
    a universal clock;
    a plurality of light sources, wherein each light source is mounted on a respective satellite;
    a controller mounted on each satellite, wherein the controller is synchronized with the universal clock for activating the light source on the same satellite to generate a light pulse and to direct the generated light pulse to a predetermined cell area on a terrestrial surface;

a receiver located proximate the predetermined terrestrial surface cell area for receiving an N number of light pulses, wherein the light pulses are transmitted from respective satellites, wherein each light pulse has a respective arrival time $t_n$ at the receiver, and wherein n is an integer between one and N; and a computer connected with the receiver for evaluating the respective pulse arrival times $t_n$ to determine a terrestrial location of the receiver.

2. A passive system as recited in claim 1 further comprising an atomic line filter to prevent solar background from obscuring the light pulses.

3. A passive system as recited in claim 2 wherein the atomic line filter has an ultra-narrow bandwidth, wide-field-of-view and operates at a wavelength $\lambda \approx 455$ nm.

4. A passive system as recited in claim 1 wherein the light pulses from respective satellites are simultaneously transmitted at a same time $t_0$, and wherein a plurality of differences $\Delta t$ between different arrival times $t_n$ are calculated, with each $\Delta t$ defining a hyperbolic curve containing the receiver, and further wherein an intersection of two different hyperbolic curves, plus the depth of the receiver, establish the position of the receiver.

5. A passive system as recited in claim 4 wherein at $t_0$, the satellites are in a known position, and $t_0$ is a precisely scheduled time.

6. A passive system as recited in claim 1 wherein the receiver is located aboard the underwater vehicle and each satellite is a geosynchronous satellite.

7. A passive system as recited in claim 6 wherein the underwater vehicle is a pre-deployed Autonomous Underwater Vehicle (AUV).

8. A passive system as recited in claim 1 wherein the light pulses are in the blue-green seawater window with a wavelength $\lambda \approx 455$ nm.

9. A passive system as recited in claim 1 wherein light pulses are generated at 1 kHz, with a pulse duration of 20 ns.

10. A passive system as recited in claim 1 wherein a cell area is 400 km$^2$.

11. A passive system as recited in claim 1 wherein the universal clock is an atomic clock.

12. A system for locating a mobile underwater terminal which comprises:

three transmitter assemblies, wherein each transmitter assembly is mounted on a different geosynchronous satellite, with each geosynchronous satellite at a known position above a terrestrial water surface for shining a light pulse onto a same predetermined cell area of the water surface, at a precisely scheduled time $t_0$:

a universal clock and a light source mounted on each transmitter;

a controller synchronized with the universal clock for activating the light source at a time $t_0$ to generate the light pulse and to shine the generated light pulse onto the predetermined cell area, wherein the light pulses are simultaneously transmitted at the time $t_0$ from a respective transmitter assembly, wherein each light pulse has a respective arrival time $t_n$ at the receiver, and wherein n is an integer between one and three;

a receiver assembly with the underwater terminal at an underwater depth d below the terrestrial water surface at the time $t_0$, for receiving the light pulse at an arrival time $t_n$; and a computer incorporated into the receiver assembly for evaluating $t_n$ together with the depth d to determine a terrestrial location for the underwater terminal.

13. A system as recited in claim 12 further comprising an atomic line filter to prevent solar background from obscuring the light pulses, wherein the atomic line filter comprises:

an x-polarizer for receiving unpolarized light in the light pulse with a wavelength $\lambda \approx 455$ nm, at the arrival time $t_n$; and an atomic vapor cell located between the x-polarizer and a y-polarizer, wherein the vapor cell rotates x-polarized light from the x-polarizer through 90° for discrimination by the y-polarizer to create a plane polarized signal having the wavelength $\lambda \approx 455$ nm for detection by an optical pulse detector and evaluation by the computer.

14. A system as recited in claim 12 wherein light pulses are generated at 1 kHz, with a pulse duration of 20 ns.

15. A system as recited in claim 12 wherein a cell area is 400 km$^2$.

16. A system as recited in claim 12 wherein the universal clock is an atomic clock.

17. A method for locating a mobile underwater terminal below a terrestrial water surface which comprises the steps of:

transmitting an N number of light pulses from respective satellites onto a predetermined cell area of the water surface, at precisely scheduled respective times $t_0$, wherein each satellite is at a known position above the terrestrial water surface;

receiving the light pulses from the respective satellites at respective arrival times $t_n$ at the underwater terminal wherein n is an integer between 1 and N, with the underwater terminal at a depth d below the terrestrial water surface; and evaluating each $t_n$ together with the depth d to determine a terrestrial location for the underwater terminal.

18. A method as recited in claim 17 further comprising the step of calculating a plurality of differences $\Delta t$ between different arrival times $t_n$, with each $\Delta t$ defining a hyperbolic curve containing the underwater terminal, and further wherein an intersection of two different hyperbolic curves, plus the depth of the underwater terminal, establish the position of the underwater terminal.

19. A method as recited in claim 17 wherein the light pulses are in the blue-green seawater window with a wavelength $\lambda \approx 455$ nm, wherein light pulses are generated at 1 kHz, with a pulse duration of 20 ns, and wherein a cell area is 400 km$^2$.

20. A passive system as recited in claim 1 wherein the light sources are lasers and operate at a wavelength $\lambda \approx 532$ nm.

21. A system as recited in claim 12 wherein the light pulses have a wavelength $\lambda \approx 532$ nm.

22. A method as recited in claim 17 wherein the light pulses have a wavelength $\lambda \approx 532$ nm.

* * * * *